3,630,968
Patented Dec. 28, 1971

3,630,968
OXIDE HAVING THE STRUCTURAL FORMULA $(La_{1-x}Ca_x)CrO_3$ WHERE $x$ IS BETWEEN .01 AND .15 AND A METHOD FOR PRODUCING THE SAME
Yoshiteru Hamano, Toyonaka-shi, Saburo Kose, Kyoto, and Makoto Kinoshita, Ikeda-shi, Japan, assignors to Agency of Industrial Science & Technology, Tokyo, Japan
No Drawing. Filed July 15, 1969, Ser. No. 842,018
Int. Cl. H01b 1/08; C04b 35/12
U.S. Cl. 252—521                                    3 Claims

ABSTRACT OF THE DISCLOSURE

A mixture of lanthanum oxide, calcium carbonate and chrome oxide is fired to produce a solid solution wherein a percentage of the lanthanum ions of the lanthanum oxide have been replaced by calcium ions. This solid solution is then pulverized and molded to produce an electrode of high electron conductivity especially appropriate for use in the magneto-hydro-dynamic generator.

---

The present invention relates to an oxide having a high electron conductivity and a method for producing the same.

Up to date, lanthanum chromite $(LaCrO_3)$ has been known as a substance displaying high electron conductivity. Since lanthanum chromite whose melting point is 2500° C. has Perovskite type crystal structure and superior high electron conductivity, the substance is being used as an electrode material for the magneto-hydro-dynamic (MHD) generator.

The primary object of the present invention is to provide an oxide having a much higher electron conductivity than lanthanum chromite.

Another object of the present invention is to provide an oxide whose conductivity variation due to temperature variation is small.

A further object of the present invention is to provide an oxide displaying a high electron conductivity at low temperature.

A further object of the present invention is to provide a method for easily producing an oxide having the above mentioned characteristics.

The present inventors have found that by substituting Ca ions for part of La ions in lanthanum chromite $(LaCrO_3)$ which is an oxide displaying a high heat resistivity and a high electron conductivity and by making the resulting substance a solid solution, the conductivity, in particular, the electron conductivity of the resulting solid solution becomes remarkably higher while the crystal lattice of the same is slightly contracted.

The method for producing the present oxide is to mix lanthanum oxide, calcium carbonate and chrome oxide in the ratio of 69–81:0.5–7.5:38 and then producing a $(LaCa)CrO_3$ solid solution by firing the mixture at about 1600° C. for about one hour. As to the mixing ratio of the lanthanum oxide and the chrome oxide, if the ratio of the lanthanum oxide is larger than the above value the resulting solid solution is easily weathered and if lesser it is easily vaporized at high temperature. For this solid solution, lanthanum hydroxide can be used in place of lanthanum oxide.

After the resulting $(LaCa)CrO_3$ solid solution is pulverized, an organic substance such as paraffin, wax emulsion or CMC etc. is added to the pulverized $(LaCa)CrO_3$ as a binder or plasticizer and the $(LaCa)CrO_3$ containing the organic substance is molded and dried by using an isostatic pressing (rubber pressing), uniaxial dry pressing or extrusion etc. Thereafter, the solid solution is fired in an oxidizing atmosphere at 1750–1850° C. for about five hours.

Where hot-press sintering is used, after the solid solution is pulverized the powder is packed in a graphite mold and sintered under a pressure of about 200 kg./cm.² at a temperature of 1600–1700° C. for 20–40 minutes. When the sintering is performed in a reducing atmosphere, defects appear in the oxygen ion lattice of the sintered substance and thus the electron conductivity of the substance is lowered. To eliminate the defects, the substance sintered in the reducing atmosphere is again fired in the air at about 1500° C. for one hour to oxidize the same.

The chemical formula of the $(LaCa)CrO_3$ solid solution is represented as follows:

$$(La_{1-x}Ca_x)CrO_3$$

where $x$ is the amount of La ions in lanthanum chromite $(LaCrO_3)$ which have been replaced by the Ca ions in solid solution therein. The value of $x$ is preferably in the range 0.01–0.15 because when $x$ is lesser than 0.01 the characteristics of the solid solution are substantially the same as those of lanthanum chromite and when $x$ is larger than 0.15, the mechanical properties of the solid solution are poor.

The mixing ratios of the constituents of the solid solution causing $x$ to be 0.01, 0.02, 0.05, 0.10 and 0.15 respectively are listed in the following table.

TABLE 1

| $x$ | $La_2O_3$ | $CaCO_3$ | $Cr_2O_3$ |
|---|---|---|---|
| 0.01 | 80.6 | 0.5 | 38.0 |
| 0.02 | 79.8 | 1.0 | 38.0 |
| 0.05 | 77.5 | 2.5 | 38.0 |
| 0.10 | 73.3 | 5.0 | 38.0 |
| 0.15 | 69.2 | 7.5 | 38.0 |

The following table shows lattice constant and the conductivity at room temperature, 500° C., 1000° C. and 1500° C. for lanthanum chromite and for the oxide obtained by sintering in accordance with the present method raw material containing constituents at each ratio shown in Table 1.

TABLE 2

| $x$ | Conductivity (ohm⁻¹ cm.⁻¹) at — | | | | $a_0$ (A.) |
|---|---|---|---|---|---|
| | room temp. | 500° C. | 100° C. | 1,500° C. | |
| 0 | 0.00168 | 0.124 | 0.214 | 0.292 | 3.880 |
| 0.01 | 0.0085 | 0.82 | 1.30 | 1.85 | 3.879 |
| 0.02 | 0.0113 | 1.39 | 2.53 | 3.13 | 3.878 |
| 0.05 | 0.575 | 3.98 | 6.46 | 6.67 | 3.874 |
| 0.10 | 1.27 | 8.3 | 11 | 14 | 3.863 |
| 0.15 | 1.62 | 11.5 | 14 | 17 | 3.858 |

Since, as is clearly seen from Table 2, the oxides in accordance with the present invention have remarkably higher conductivities than those of lathanum chromite, the variation of conductivity due to the variation of temperature is small and, in particular, since the oxides have high conductivities at low temperature, they can be utilized as electrode materials for the semi-hot type MHD generator or as resistance-heating elements.

Some examples are described hereinafter, however, it should be appreciated that these examples are described only as illustrations and the present invention is not restricted thereto.

EXAMPLE 1

77.5 g. of lanthanum oxide, 2.5 g. of calcium carbonate and 38.0 g. of chrome oxide were mixed and the mixture was heated to 1600° C. and held at this temperature for one hour to produce $(LaCa)CrO_3$ solid solution. The resulting solid solution was pulverized and packed in a graphite mold. The solid solution in the graphite mold was heated from room temperature to 1650° C. under a pressure of 200 kg./cm.² and pressure sintered at 1650°

C. for twenty minutes. The bulk density of the sintered substance whose diameter was 10 mm. and length was about 20 mm. was 5.4 and the porosity of the same was 20%. Platinum powder was applied to both end surfaces of the sintered substance and it was fired in the air in an electric furnace at 1500° C. for one hour. As a result, a large number of electron holes which serve as carriers were formed in the fired substance and the platinum on the end surfaces was glazed. In the resulting oxide the amount of La ions replaced by Ca ions in solid solution therein, was 0.05 and the conductivity of the oxide was the same as the value in Table 2 where $x$ is 0.05.

EXAMPLE 2

The solid solution obtained in Example 1 was pulverized. Boric acid was mixed at a ratio of one weight percent of the solid solution as a binder with the pulverized solid solution.

A graphite mold was filled with the mixture, and the mixture was heated from room temperature to 1380° C. under a pressure of 200 kg./cm.$^2$ and pressure sintered at 1380° C. for twenty minutes. The bulk density of the sintered substance was 6.72 and the porosity of the same was 1%.

Platinum powder was applied to both and surfaces of the sintered substance and fired in the air at 1500° C. for one hour.

The conductivity of the fired substance was the same as that in Example 1.

EXAMPLE 3

The solid solution obtained in Example 1 was pulverized to particles having a diameter less than 2$\mu$. 3 weight percent of paraffin to the weight of solid solution was mixed with it and the mixture was formed by isostatic pressing into a rod of 15 mm. in diameter and 250 mm. in length. The formed rod of the solid solution was fired in an oxidizing atmosphere at 1750–1850° C. for about five hours. The bulk density of the resulting oxide was 6.28, the porosity of the same was 7.6% and the conductivity of the same was equal to that in Example 1.

We claim:
1. An oxide having the structural formula

$$(La_{1-x}Ca_x)CrO_3$$

wherein $x$ is between 0.01 and 0.15 and represents La ions in lanthanum chromite for which Ca ions have been substituted.

2. A method for producing an oxide having conductivity, comprising the steps of firing a mixture of lanthanum oxide, calcium carbonate and chrome oxide in the respective ratios of 69–81:0.5–7.5:about 38 at about 1600° C. for about one hour to produce a solid solution having the structure $(La_{1-x}Ca_x)CrO_3$ wherein $x$ is between .01 and .15, and represents the amount of La ions in LaCrO$_3$ which have been replaced by Ca ions in said solid solution, pulverizing said solid solution, forming said pulverized solid solution, and then firing said formed solid solution in an oxidizing atmosphere at 1750–1850° C.

3. A method for producing an oxide having a high conductivity, comprising the steps of firing a mixture of lanthanum oxide, calcium carbonate and chrome oxide in the respective ratios of 69–81:0.5–7.5:about 38 at about 1600° C. for about one hour to produce a solid solution having the structure $(La_{1-x}Ca_x)CrO_3$ wherein $x$ is between .01 and .15, and represents the amount of La ions in LaCrO$_3$ which have been replaced by Ca ions in said solid solution, pulverizing the resulting solid solution, filling a graphite mold with said solid solution, sintering said solid solution under a pressure of about 200 kg./cm.$^2$ at 1300–1700° C. for 20–40 minutes, and then firing the resulting substance in an oxidizing atmosphere at about 1500° C. for about one hour.

References Cited

UNITED STATES PATENTS

| | | | |
|---|---|---|---|
| 3,149,253 | 9/1964 | Luebke | 310—11 |
| 3,420,780 | 1/1969 | Forrat et al. | 106—66 X |
| 3,423,611 | 1/1969 | D'Albis et al. | 310—11 |
| 3,490,067 | 1/1970 | Foex | 252—521 |

JOHN T. GOOLKASIAN, Primary Examiner

J. C. GIL, Assistant Examiner

U.S. Cl. X.R.

106—66; 252—518; 310—11